W. Swan,
Ornamenting Fabrics.
No. 78,156.  Patented May 19, 1868.
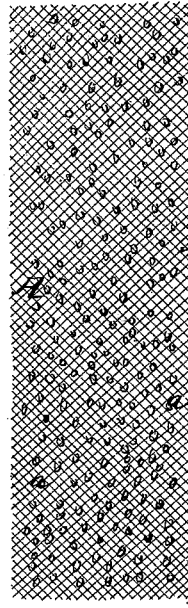
Witnesses:
H. C. Ashkettle
Wm. A. Morgan
Inventor:
W. Swan
per Munn &
Attorneys

United States Patent Office.

WILLIAM SWAN, OF NEW YORK, N. Y., ASSIGNOR TO HIMSELF AND LOUIS DUHAIN, JR., OF SAME PLACE.

*Letters Patent No. 78,156, dated May 19, 1868.*

MODE OF ORNAMENTING FABRICS.

*The Schedule referred to in these Letters Patent and making part of the same.*

TO ALL WHOM IT MAY CONCERN:

Be it known that I, WILLIAM SWAN, of the city, county, and State of New York, have invented a new and improved Method of Ornamenting Fabric; and I do hereby declare that the following is a full, clear, and exact description thereof, which will enable others skilled in the art to make and use the same, reference being had to the accompanying drawing, forming part of this specification.

The drawing represents a section of gauze, ornamented in accordance with my invention.

This invention relates to a new process of ornamenting fabrics of all descriptions, such as gauze, silk, and others, and consists in securing a series of small beads or drops, made of gum-arabic or other gum, to the fabric, said beads being translucent, so that they appear like drops of water, or like pieces of crystal or glass, on the fabric, and serve, in a large degree, to increase the beauty and appearance of such fabric.

The gum to be used must be dissolved, which is done by subjecting it to the action of a steam or vapor-bath, and when it is thus dissolved, it is ready for use, and is sprinkled, printed, or otherwise applied upon the fabric in small drops, which, when hardened, will appear like crystal beads interwoven with the fabric.

The gum may be mixed with suitable coloring-matter, so that the drops may be colored, and the most beautiful effects can thus be produced.

In the accompanying drawing, A represents a piece of fabric, upon which the drops or beads *a a* are secured in the aforesaid manner.

Having described my invention, what I claim as new, and desire to secure by Letters Patent, is—

An ornamental fabric, provided with drops or beads *a a*, that are composed of the material, and are made and applied in the manner, substantially as herein shown and described.

WILLIAM SWAN.

Witnesses:
    WM. F. MCNAMARA,
    ALEX. F. ROBERTS.